No. 640,528. Patented Jan. 2, 1900.
J. T. BENNETT.
APPARATUS FOR REMOVING SACCHARIN OR OTHER IMPURITIES FROM ALL KINDS OF LIQUIDS.
(Application filed June 9, 1899.)
(No Model.) 2 Sheets—Sheet 2.
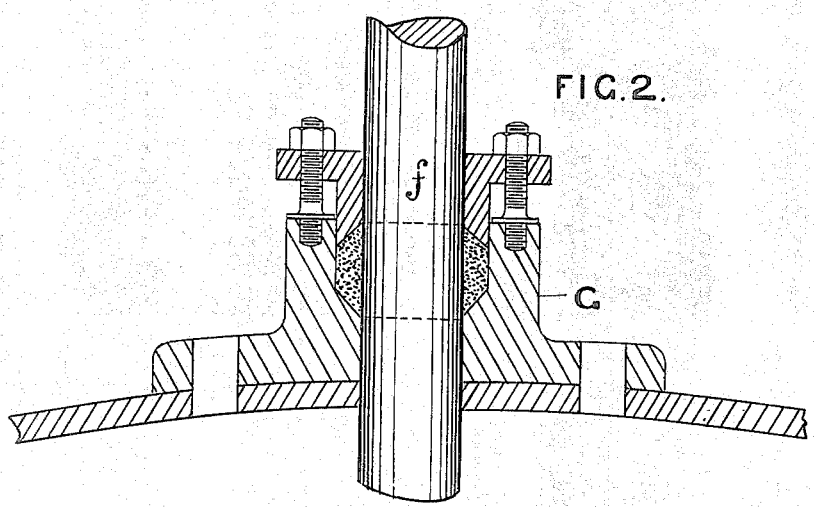
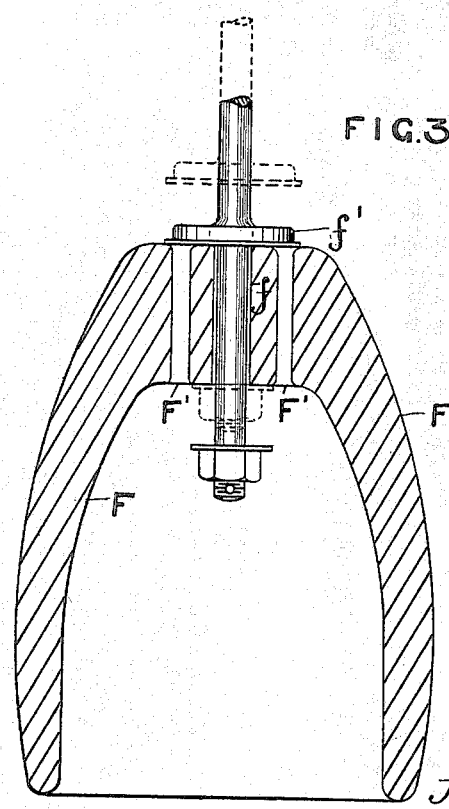

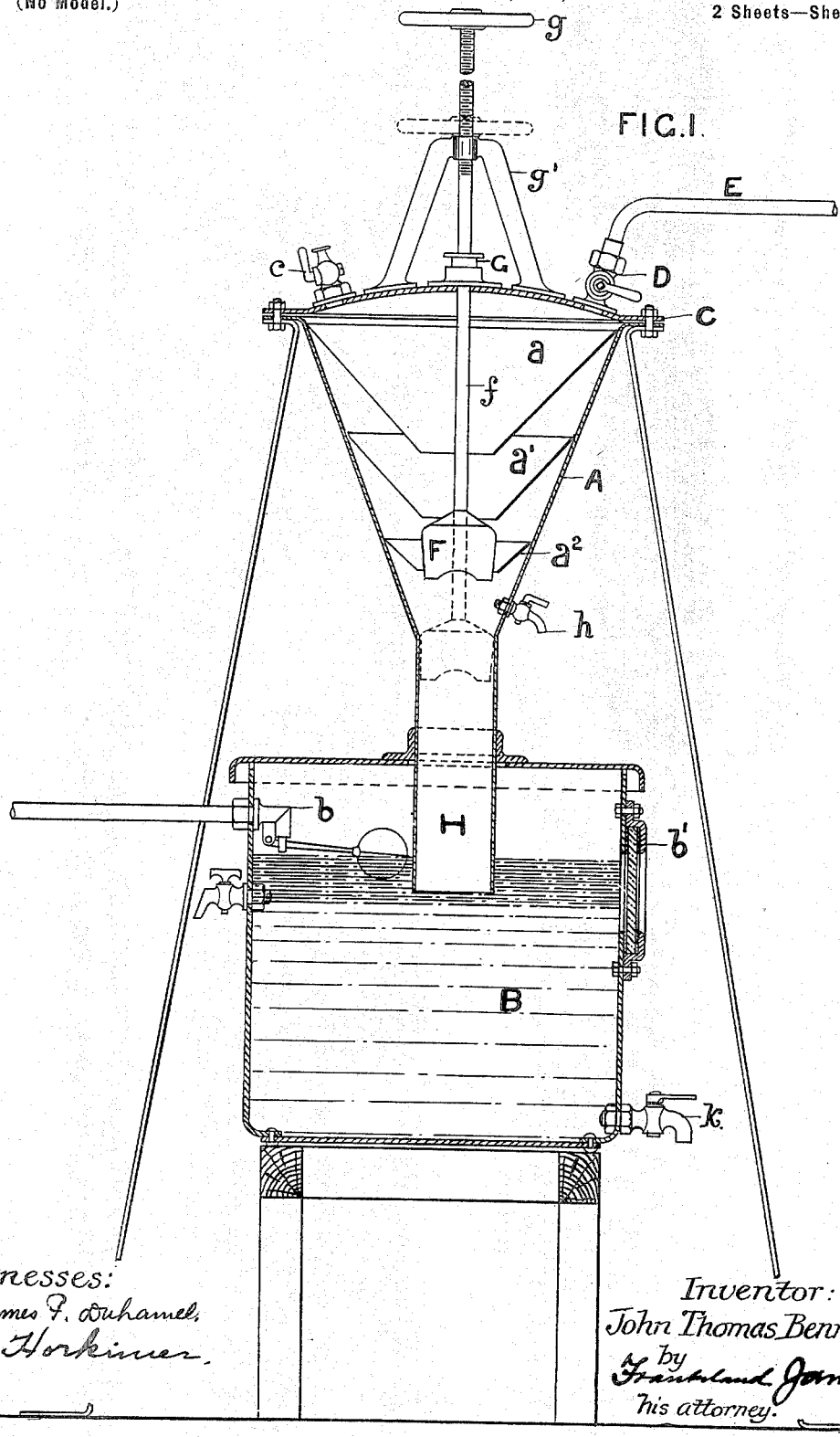

UNITED STATES PATENT OFFICE.

JOHN THOMAS BENNETT, OF CAPE TOWN, CAPE COLONY.

APPARATUS FOR REMOVING SACCHARIN OR OTHER IMPURITIES FROM ALL KINDS OF LIQUIDS.

SPECIFICATION forming part of Letters Patent No. 640,528, dated January 2, 1900.

Application filed June 9, 1899. Serial No. 719,989. (No model.)

*To all whom it may concern:*

Be it known that I, JOHN THOMAS BENNETT, hotel proprietor, of Wynberg, Cape Town, Cape Colony, have invented certain new and useful Improvements in Purifying Liquids, (for which I have obtained Letters Patent in Great Britain, No. 24,741, dated November 23, 1898; in France, No. 284,839, dated January 11, 1899; in Belgium, No. 140,349, dated January 16, 1899; applications still pending in Germany, dated January 12, 1899, and in Spain, dated March 1, 1899,) of which invention the following is a full, clear, and exact specification.

This invention relates to an improved apparatus for removing saccharin or other impurities from all kinds of liquids.

My chief object is to remove the saccharin, fusel-oil, sediment, and other similar impurities from wines and spirits; but my invention can also be applied in the purifying treatment of other liquids.

In a previous patent, No. 604,927, dated May 31, 1898, I have described a process and apparatus for purifying wines and spirits, and my present invention is a development and an improved form of the apparatus therein described.

By means of my present invention I am enabled to treat liquids in a more expeditious and more efficacious manner, the results being even superior to those previously attained.

The improvements consist in forcing the lower thickened portion of the liquid under treatment, which portion contains the sediment and impurities which are being precipitated from the liquid, into the absorbent water-bath, supporting the liquid treated, by means of a piston or plunger of a special construction.

The improved apparatus consists of a funnel-shaped hopper or vessel fitted with a number of concentric removable cones delivering or directing the sediment which is settling toward the bottom of the container into a central path or descent and forcing this settling portion of the liquid into the pipe leading to the water-bath below by means of a plunger specially constructed and fitted for this purpose.

Upon the accompanying sheet of drawings I have shown my improved apparatus for purifying all kinds of alcoholic and other liquids.

Figure 1 is a sectional elevation of the new form of apparatus. Fig. 2 is an enlarged view of the air-tight gland, and Fig. 3 is a similar view of an alternative plunger employed.

On the drawings, A is a funnel-shaped vessel or hopper fitted within any suitable stand over a water-bath B. It is provided with an air-tight lid C and a cock or union D, through which a pipe E can deliver into the hopper the alcoholic or other liquid to be treated. It is also furnished with an air-cock $c$ and a number of removable abruptly-cone-shaped chutes $a$ $a'$ $a^2$, arranged concentrically one above another and secured in position by the converging walls of the hopper A. The water-bath B is preferably furnished with a cover or lid for the purpose of preventing the water from being contaminated by the introduction of foreign matter or otherwise affected by impurities suspended in the outer atmosphere. These removable chutes $a$ $a'$ $a^2$ leave a central path or space within the hopper, within which a plunger or collecting-chamber F, suitably journaled in the lid of the hopper, can be raised or depressed. The plunger F is shown secured to a rod $f$, passing through an air-tight gland G, (shown on Fig. 2,) and can be screwed up or down by means of a hand-wheel $g$ and supporting-bracket $g'$, as shown on Fig. 1, or by any other similar device.

The base of the hopper A communicates with and delivers into the water-bath B by means of a neck or pipe H, which latter may, if desired, be fitted with a stop-valve; but this is no longer necessary to my process. Near the base of the funnel A and immediately above the neck or pipe H is a draw-off valve $h$.

The water-bath B, into which the sediment and other impurities are precipitated and forced from the vessel A, is exposed to atmospheric pressure and is furnished with a ball-cock $b$, admitting water thereto, a transparent panel $b'$, and an outlet-pipe or a delivery-cock $k$. The water in the bath B is kept to a constant level above the outlet of the neck or pipe H by means of the ball-cock $b$, as in ordinary cisterns, and a continual flow of water through the bath B can be insured by means of the cocks $b$ and $k$ carrying off heavy matters and facilitating absorption.

The plunger F, which is made of wood or other suitable material, may be of a fixed pattern, as shown on Fig. 1, having a tapered upper portion and a cone-shaped lower portion, (these cones being placed base to base,) which lower portion is hollowed out underneath, so as to give a concave shape. It is rigidly secured to the rod $f$ by any suitable means. The plunger F can be screwed down so as to fit the bore of the neck or pipe H, and thus cut off or separate the vessel A from the pipe H and water-bath B. Alternatively it may be constructed as shown on Fig. 3. The plunger F can then slide for a short distance up or down the rod $f$ and is furnished with a number of perforations or passages F' F'. The rod $f$ has a fixed washer $f'$, which when depressed onto the plunger F acts as a valve and closes the passages F'. Fig. 3 illustrates the arrangement in this position. When the plunger is afterward raised, the rod $f$ first passes through the plunger, according to the play or limit provided, and when the fastening nut or shoulder reaches the base of the plunger the latter is drawn upward, together with the rod $f$.

A draw-off tap may also be provided in the upper portion of the water-tank B in such position that the impurities which rise to the surface of the water can be drawn off through this tap.

I wish here to remark that the length of the neck or pipe H in proportion to the capacity of the hopper A has been exaggerated on the drawings, so as to facilitate the comprehension of the working of the apparatus.

The operation of the apparatus is as follows: The plunger F is first screwed down, so as to close the neck or pipe H. Water is then admitted through the ball-cock into the water-bath B to the normal level, and the alcoholic or other liquid to be treated is admitted into the hopper A through the cock D. For the sake of example I will assume this liquid to be whisky, which it is wished to purify of its fusel-oil, &c., although the same method will serve in the case of sherry or other wine, and assume that the air-cock $c$ has been opened. When the vessel A is quite full, the cocks D and $c$ are closed and the plunger F is screwed back to its raised position. A certain amount of whisky will then fall into the neck or pipe H, and the column of air in the latter will pass therefrom up through the whisky in H and A to the upper portion of the hopper A. By its ascent this air will to a certain extent agitate or at least disturb the whisky in A and the process thus commences. The atmospheric pressure upon the liquid in tank B will support the whisky in the hopper A, and so long as not more than a certain quantity of air is present at the top of the hopper A the whisky will be unable to pass out through the neck or pipe H. Precipitation of the sediment and other impurities in the whisky then commences, and these impurities settle toward the bottom of the hopper and the pipe H. Those near the sides of the hopper will fall upon the inclined chutes $a$ $a'$ $a^2$ and will be directed toward the center or axis of the hopper A, and a certain portion of them will be delivered into and partly absorbed by the water in the bath B. After a time the plunger F is gently screwed down the central descent and forces the remaining and slowly-settling impurities toward and into the neck or pipe H. This forcing or depressing action of the plunger may be termed a "scrubbing action," which it resembles. The plunger F is allowed to remain at the top of the neck or pipe H for some time and is then slowly and cautiously screwed upward, care being taken that the upward suction produced by the plunger does not withdraw any impurities from the pipe H. By proceeding slowly this is obviated, owing to the tapered shape of the upper portion of the plunger, and to further guard against this undesirable result the passages F' F' are designed to facilitate the upward movement of the plunger as much as possible without disturbing the contents of the hopper A. It will be seen that when raising the plunger illustrated in Fig. 3 the washer or shoulder $f'$ is first raised, and when the lower nut afterward carries the plunger upward the passages F' are open and the whisky freely passes through. The dotted lines show the washer raised above the passages F'. The impurities originally contained in the whisky will thus pass into the bath B and will remain at the top thereof—e. g., fusel-oil—or will be absorbed by the water—e. g., saccharin—or will remain suspended in the water—e. g., sediment—or some of these impurities will sink to the bottom of the bath and will pass out through outlet K if a constant flow of water be provided. The lowering of the plunger F into the pipe H may be repeated several times, and when it is estimated that the purifying process is complete (a sample of the whisky can at any time be taken from the draw-off cock $h$) the plunger is finally screwed down, so as to close the neck or pipe H, and the purified whisky can be drawn off by opening the air-cock $c$.

The impurities in the water-bath B can be specially drawn off and afterward treated or may be thrown away.

The hopper A can be cleaned out by means of steam or hot or cold water when desired, and the cone-shaped chutes $a$ $a'$ $a^2$, being removable, present no inconvenience.

Whiskies or other alcoholic liquids treated by my process are afterward found to be equal in flavor to those fully matured and the harmful properties possessed by most new wines—e. g., champagne or other liquids—are after such treatment removed therefrom.

As liquids which may with advantage be treated by my process I may mention, in addition to alcoholic liquids, tea, from which tannin can be removed, medicines, oils, &c.

Having now described my invention, what I claim, and desire to secure by Letters Patent, is—

1. An apparatus for purifying liquids by gravity comprising a tank adapted to contain water, a receiving-hopper connected with the tank and provided with inverted centrally-deflecting cones formed with central openings and a vertically-moving plunger adapted to move through the openings in the deflectors to accelerate the descent of impurities deflected toward the center and in its lower position to close the connection between the hopper and tank.

2. An apparatus for purifying liquids by gravity, comprising a tank adapted to contain water, a hopper having a closed upper portion above said tank and a lower portion of reduced diameter entering the liquid in the tank, a series of inverted-cone-shaped deflectors arranged within the hopper, each formed with a central opening, a vertically-moving piston adapted to close the reduced lower portion of the hopper and to be moved vertically through the openings in the deflectors, means for supplying liquid to be purified to the upper portion of the hopper and for withdrawing liquids from the tank.

3. An apparatus for purifying liquids by gravity, comprising a combination of a tank, an automatic supply-cock for maintaining a constant level of water in the tank and a draw-off cock therefor, of a funnel-shaped hopper having its reduced lower portion entering and extending below the normal water-level of the tank, an air-cock and a cock adapted to supply liquid to be purified in the upper portion of the tank, and a vertically-moving piston adapted when in its lower position to close the lower portion of the hopper.

4. The combination with a tank and an automatic supply-cock for maintaining the constant water-level therein, a funnel-shaped hopper having a closed upper portion and secured above the tank with its reduced lower portion entering and extending below the normal water-level thereof, a series of superposed inverted deflecting-cones arranged within the hopper and each formed with a central opening of substantially the same diameter as the lower portion or leg of the hopper and a vertically-moving piston of inverted conical form adapted to be raised and lowered through the openings in the deflectors and to close the lower portion of the hopper, said piston being provided with vertical passages and a valve adapted to close said passages when the piston is forced downward and to uncover and open said passages when the piston is raised.

5. In an apparatus for purifying liquids by gravity, the combination with a receiving-hopper of superposed inverted centrally-deflecting cones each formed with a central opening and a vertically-moving plunger having vertical passages therein, a vertical rod extending through the hopper and plunger and provided with means for raising and lowering the rod and plunger said rod having a limited movement through the plunger and provided with a fixed valve limiting said movement and adapted to rest upon and close the openings in the plunger when forced downward and to move away from and free said openings when the plunger is raised.

In witness whereof I have hereunto set my hand in presence of two witnesses.

JOHN THOMAS BENNETT.

Witnesses:
 GEO. W. WHITTON,
 FRED C. HARIES.